(12) United States Patent
Aoyama et al.

(10) Patent No.: US 7,169,868 B2
(45) Date of Patent: Jan. 30, 2007

(54) MOLDING MATERIAL FOR OZONE-RESISTANT ARTICLES AND OZONE-RESISTANT INJECTION-MOLDED ARTICLES

(75) Inventors: Takahisa Aoyama, Settsu (JP); Katsuhide Ohtani, Settsu (JP); Hitoshi Imamura, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/497,586

(22) PCT Filed: Dec. 4, 2002

(86) PCT No.: PCT/JP02/12690

§ 371 (c)(1),
(2), (4) Date: Jun. 3, 2004

(87) PCT Pub. No.: WO03/048214

PCT Pub. Date: Jun. 12, 2003

(65) Prior Publication Data

US 2005/0020792 A1  Jan. 27, 2005

(30) Foreign Application Priority Data

Dec. 4, 2001  (JP) ............................ 2001-370109
Jun. 25, 2002 (JP) ............................ 2002-185180

(51) Int. Cl.
*C08F 16/24* (2006.01)
(52) U.S. Cl. .................... 526/247; 152/209.1; 526/250
(58) Field of Classification Search ................ 526/247, 526/250; 152/209.1
See application file for complete search history.

(56) References Cited

U.S. PATENT DOCUMENTS 5,000,875 A * 3/1991 Kolouch .................... 252/511
6,258,907 B1 * 7/2001 Funaki et al. ............... 526/247
6,635,717 B1 * 10/2003 Kishine et al. ............. 525/276
6,998,454 B2 * 2/2006 Taira et al. ................. 526/247

FOREIGN PATENT DOCUMENTS

| CA | 1 248 292 | 1/1989 |
|---|---|---|
| EP | 0 220 910 A2 | 5/1987 |
| EP | 220910 A2 * | 5/1987 |
| EP | 1462458 A1 * | 9/2004 |
| JP | 60-240713 | 11/1985 |
| JP | 60-240713 A | 11/1985 |
| JP | 10-87746 | 4/1998 |
| JP | 10-87746 A | 4/1998 |
| WO | WO 00/44797 | 8/2000 |
| WO | WO 00/44797 A1 | 8/2000 |

OTHER PUBLICATIONS

International Search Report for PCT/JP02/12690 dated Mar. 25, 2003 (with english translation).*
International Search Report for PCT/JP02/12690 dated Mar. 25, 2003.

* cited by examiner

*Primary Examiner*—Ling-Sui Choi
*Assistant Examiner*—Henry S. Hu
(74) *Attorney, Agent, or Firm*—Sughrue Mion, PLLC

(57) ABSTRACT

Highly ozone-resistant molding/shaped articles inclusive of piping materials and joints for use in semiconductor production lines, molding materials for ozone-resistant molding/shaped articles which are suited for the production of the molding/shaped articles, and ozone-resistant injection-molded articles and relevant injection-molding materials. Also disclosed is a molding material for ozone-resistant molding/shaped articles including a copolymer (A) and having a melt flow rate of 0.1–50 g/10 minute. The copolymer (A) is a copolymer including tetrafluoroethylene and a perfluorovinylether, and has not less than 3.5 mass % of a perfluorovinylether unit, a melting point of not less than 295° C., and not more than 50 of unstable terminal groups per $1 \times 10^6$ carbon atoms in the copolymer (A).

8 Claims, No Drawings

MOLDING MATERIAL FOR OZONE-RESISTANT ARTICLES AND OZONE-RESISTANT INJECTION-MOLDED ARTICLES

TECHNICAL FIELD

The present invention relates to molding materials for ozone-resistant molding/shaped articles, ozone-resistant molding/shaped articles, ozone-resistant injection-molded articles, and injection-molding materials.

BACKGROUND TECHNOLOGY

In the field of semiconductor production, large quantities of chemical solutions and water are used in wet processes, and as molding materials for the pipeline inclusive of piping materials and joints for the transport of such liquors, fluororesins which are highly resistant to chemicals and heat are employed.

Among fluororesins, tetrafluoroethylene [TFE]-perfluoro (alkylvinylether) [PAVE] copolymers [PFA] are used universally and particularly TFE-perfluo(propylvinylether) [PPVE] copolymers having excellent chemical resistance and heat resistance as well as good stress-crack resistance are in popular use as appropriate molding materials. Although PFA has been found to be free from prominent drawbacks, its copolymers with the PPVE unit content confined to less than 3.5 mass % are used in many cases today for suppressing the cost increase and improving the efficiency of copolymer production.

In molding fluororesins, whereas geometrically uncomplicated parts such as tubing are produced by extrusion molding, geometrically complicated parts such as joints and other joints are chiefly produced by injection molding. For injection molding, fluororesins having comparatively low melt viscosities are used mainly for improved molding productivity, although these are inferior in stress-crack resistance to fluororesins having high melt viscosities. As the fluororesins for injection molding, taking PFA as an example, resins of the grade with a melt flow rate [MFR], which is an index of melt viscosity, of not less than 10 g/10 minute are broadly sold and used.

In the field of semiconductor production processes, studies have been undertaken on the use of ozone, which has a strong degrading effect on organic matter, in the cleaning of wafers and devices, for resist stripping, and for imparting hydrophilicity to surfaces, among other uses in the recent years.

Ozone has heretofore been used in the form of ozonized water for the purification and disinfection of town water but, for the following reasons, ozone crack resistance was not a major consideration.
1. Since the ozone concentration of ozonized water, even when high, is of the order of 200 ppm, the influence of ozone was limited.
2. In cases where the effect of trace metal contaminations of town water and the like flowing through pipelines can be disregarded, metallic piping has so far been used because it has nothing wrong with its strength.

However, in semiconductor production processes, where metal contaminations must be minimized, it is necessary to use resins as molding materials for piping materials and joints and, it is preferable to use fluororesins in view of their superior chemical resistance and heat resistance.

Furthermore, in the recent semiconductor production processes, for the purpose of improving the process efficiency, particularly in the resist stripping stage, several means have been proposed for enhancing the activity of ozone, such as increasing the ozone concentration of ozonized water from the order of 200 ppm to 1,000–200,000 ppm, increasing the treating temperature from the general room temperature to 80–150° C., and adding water vapor as a catalyst. As the conditions of use of ozone have thus become more and more tough, the load on the piping materials and chambers has been considerably increased. The problem accordingly developed that if the conventional PFA is used as the fluororesin, the ozone will penetrate into the moldings to cause cracks which inevitably lead to decreases in dynamic strength.

As a means for preventing ozone crack troubles, it was proposed to replace PFA with polytetrafluoroethylene [PTFE] which is more resistant to ozone but PTFE moldings are deficient in transparency so that when these are used as pipeline materials, the movement and level of the liquid in the pipeline cannot be clearly detected, resulting in lack of visibility. Furthermore, PTFE cannot be used for melt-molding, and in the case of producing geometrically complicated parts, the parts must be machined out of a block molding but this practice adds to increased industrial wastes and processing cost.

As the ozone-resistant fluororesin for injection molding, a PFA with a melting point of 300–310° C. is commercially available. However, this commercial resin is deficient in the folding endurance with the indicator MIT value being as few as 200,000 cycles and it is disclosed only that its ozone resistance is derived exclusively from the high purity of the fluororesin.

SUMMARY OF THE INVENTION

The present invention, developed in view of the above-mentioned state of the art, has for its object to provide highly ozone-resistant molding/shaped articles inclusive of piping materials and joints for use in semiconductor production lines, molding materials for ozone-resistant molding/shaped articles suited for the production of said molding/shaped articles (molding articles or shaped articles), and ozone-resistant injection-molded articles and relevant injection-molding materials.

The present invention is directed to a molding material for ozone-resistant molding/shaped articles comprising a copolymer (A) and having a melt flow rate of 0.1–50 g/10 minutes, wherein said copolymer (A) is a copolymer comprising tetrafluoroethylene and a perfluorovinylether, and has not less than 3.5 mass % of a perfluorovinylether unit, a melting point of not less than 295° C., and not more than 50 of unstable terminal groups per $1\times10^6$ carbon atoms in said copolymer (A). This is hereinafter referred to as the "ozone-resistant molding material (I)" of the present invention.

The present invention is further directed to a molding material for ozone-resistant molding/shaped articles comprising a copolymer (B) and having a melt flow rate of 0.1–50 g/10 minutes, wherein said copolymer (B) is a copolymer comprising tetrafluoroethylene and perfluoro (propylvinylether) and has 3.5–6 mass % of a perfluoro (propylvinylether) unit and not more than 50 of unstable terminal groups per $1\times10^6$ carbon atoms in said copolymer. This molding material is hereinafter referred to as the "ozone-resistant molding material (II)" of the present invention.

The present invention is further directed to an ozone-resistant injection-molded article comprising a perfluororesin, wherein said perfluororesin comprises a perfluoropolymer, and has an MIT value of over 200,000 cycles, a melting point of not less than 230° C. and not more than 50 of unstable terminal groups per $1 \times 10^6$ carbon atoms in said perfluoropolymer. This molding/shaped article is hereinafter referred to as the "ozone-resistant injection-molded article (i)" of the present invention.

The present invention is further directed to an ozone-resistant injection-molded article comprising a perfluororesin wherein said perfluororesin comprises a perfluoropolymer, and has an MIT value of not less than 300,000 cycles and not more than 50 of unstable terminal groups per $1 \times 10^6$ carbon atoms in said perfluoropolymer. This molding/shaped article is hereinafter referred to as the "ozone-resistant injection-molded article (ii)" of the present invention.

The present invention is further directed to an injection-molding material for use in production of said ozone-resistant injection-molded article (i) or ozone-resistant injection-molded article (ii).

DISCLOSURE OF THE INVENTION

The present invention is now described in detail.

The cause of ozone cracks in a fluororesin, such as copolymer [PFA] comprising tetrafluoroethylene [TFE] and perfluoro(alkylvinylether) [PAVE], which is expected to be chemically stable material even against ozone having a high redox potential, is suspected to be that gases generated by the ozone-induced degradation of impurities unavoidably contaminated in the fluororesin during production thereof or gaseous oxygen generated by a chemical reaction according to the reaction scheme $O_3+O_3=3O_2$ due to autolysis of ozone in the presence of such impurities are pooled and entrapped in the molded fluororesin molding/shaped article to internally build up high-pressure masses of gas, the expansive forces of which ultimately tear apart the molding/shaped article from its inside.

The inventors of the present invention searched for means for preventing formation of ozone cracks resulting from the evolution of gases generated due to ozone within the molded article, and considered that effective be (1) the method of protecting the molded article from cleavage easily by the expansive forces of gases upon the generation thereof in the molded article and/or (2) the method of minimizing the generation of gases, and conducted further intensive studies.

In the case of conducting the method (1), it may be contemplated to increase the molecular weight of a fluororesin or to soften the fluororesin, e.g. to increase in the PAVE content taking PFA as an example. However, if the fluororesin is softened, the infiltration of contaminants from external environment is increased in the course of molding and in use of the molded article to cause their carryovers and, in addition, the degree of crystallinity diminishes owing to the increased PAVE content resulting in falling the melting point of the fluororesin, so that not only the heat resistance is sacrificed but also the gas barrier properties are impaired to allow an increased penetration of ozone. Furthermore, the molded article remarkably varies in shape when subjected to external forces so that the alignment with the existing semiconductor production line is adversely affected and it is rendered impossible to further deform the molded article, which is a conventional practice, for example the processing of tube ends.

Therefore, although the method (1), taken alone, may accomplish the object of improving ozone resistance, the inherent physical properties and moldability of fluororesins are adversely affected.

The present invention, therefore, provides molding materials not only excellent in ozone resistance but fully retaining the chemical resistance, heat resistance, and mechanical characteristics of fluororesins, which molding materials have been implemented by limiting the modification by said method (1) to the extent not impairing the physical properties and moldability of the fluororesin and taking said method (2) in combination with the above-mentioned method (1).

The molding material for ozone-resistant molding/shaped articles according to the present invention is a molding material especially suitable for molding ozone-resistant molding/shaped articles and can, therefore, be used with advantage in molding ozone-resistant molding/shaped articles.

In this specification, the term "ozone resistance" (or "resistivity to ozone") means that when an ozone-resistant molding/shaped article or molded article such as the ozone-resistant injection-molded article to be described hereinafter is exposed to an ozone gas with not less than 1,000 ppm of ozone concentration supplemented with 0.001–30 mass parts of water vapor per mass part of ozone, no cracks are developed in the molded article or, even if the molded article is cracked, the number of cracks of not less than 10 μm in length, which will be found in the measurements of resistivity to ozone described hereinafter, is not more than 10 per $mm^2$ of the surface of the molded article as measured by the crack measuring method herein described.

In this specification, provided that the ozone concentration of the above-mentioned water-vapor supplemented ozone gas is within the above-mentioned range, the ozone resistance may only be shown at not more than 200,000 ppm of ozone concentration, preferably not less than 5,000 ppm of ozone concentration, more preferably not less than 10,000 ppm of ozone concentration. For example, when ozone is used in semiconductor production processes, the ozone concentration of said water vapor-supplemented ozone gas is usually not higher than 200,000 ppm, and the concentration of the ozone produced on irradiation of air with ultraviolet light is usually not higher than 200 ppm. It is to be understood that the above-mentioned ozone concentration is the value after the dilution with water vapor.

Furthermore, provided that the water vapor content of said water vapor-supplemented ozone gas is within the above-mentioned range, the above-mentioned ozone resistance should be accomplished preferably at not less than 0.01 mass part of water vapor per mass part of ozone, more preferably at not less than 0.1 mass part of that. For example, when ozone is used in a semiconductor production process, water vapor is added as a catalyst for enhancing the activity of ozone but the water vapor content of said water vapor-supplemented ozone gas is usually not less than 0.01 mass part per mass part of ozone.

The ozone-resistant molding material (I) of the present invention comprises said copolymer (A), and the above-mentioned copolymer (A) is a copolymer comprising tetrafluoroethylene [TFE] and a perfluorovinylether [PFVE].

The PFVE component of said copolymer (A) is not particularly restricted but includes perfluoro(alkylvinylether) such as perfluoro(methylvinylether) [PMVE], perfluoro(ethylvinylether), perfluoro(propylvinylether) [PPVE], perfluoro(butylvinylether), perfluoro(pentylvinylether), perfluoro(hexylvinylether), perfluoro(heptylvinylether), etc.; and perfluoro(alkoxyalkylvinylether) such as $CF_2=CFO(CF_2CF(CF_3)O)CF_3$, $CF_2=CFO(CF_2CF(CF_3)O)_2CF_3$, $CF_2=CFO(CF_2CF(CF_3)O)_3CF_3$, $CF_2=CFO(CF_2CF(CF_3)O)CF_2CF_3$, $CF_2=CFO(CF_2CF(CF_3)O)_2CF_2CF_3$, $CF_2=CFO(CF_2CF(CF_3)O)_3CF_2CF_3$, $CF_2=CFO(CF_2CF(CF_3)O)CF_2CF_2CF_3$, $CF_2=CFO(CF_2CF(CF_3)O)_2CF_2CF_2CF_3$, $CF_2=CFO(CF_2CF(CF_3)O)_3CF_2CF_2CF_3$, and so forth. Among these, PPVE is preferred from the standpoint of good copolymerizability with TFE and imparting high heat resistance to copolymer (A)

The above-mentioned copolymer (A) is a copolymer comprising TFE and PFVE and the above-mentioned copolymer comprising TFE and PFVE is a copolymer substantially composed of TFE and PFVE units. In this specification, the term "substantially" means that, taking copolymer (A) as an example, TFE and PFVE units account for most part of the monomer units, with the total of TFE and PFVE units accounting for not less than 95 mol % of all the monomer units in copolymer (A).

In this specification, the term "monomer unit", such as the above-mentioned "TFE unit" or the above-mentioned "PFVE unit", for instance, means a part of the molecular structure in a copolymer such as the above-mentioned copolymer (A), which is derived from the particular monomer used. For example, said "TFE unit" means a part derived from TFE and said "PFVE unit" means a part derived from PFVE. The above-mentioned phrase "the total of TFE and PFVE units accounting for not less than 95 mol % of all the monomer units in copolymer (A)", for instance, means that the part derived from TFE and the part derived from PFVE in the molecular structure of all the monomer units in the copolymer (A) combinedly account for not less than 95 mol % of all the parts derived from monomers, inclusive of TFE and PFVE, of the copolymer (A).

Thus, the above-mentioned copolymer (A) may have a unit derived from some other copolymerizable monomers than said TFE and PFVE units in a proportion of not more than 5 mol %, unless the properties of copolymer (A) is not materially affect.

The above-mentioned copolymer (A) has not less than 3.5 mass % of PFVE units. If it is less than 3.5 mass %, the ozone crack resistance sought by the present invention cannot be obtained, although the mechanical strength and heat resistance are improved. The preferred lower limit is 4.0 mass % and the more preferred lower limit is 4.5 mass %. When PPVE is used as PFVE, the preferred proportion is over 4.0 mass %.

The PFVE unit content of the above-mentioned copolymer (A) varies with species of PFVE and objective kinds of molding/shaped articles and cannot be specified in general terms but at least the copolymers lean in crystallinity and showing elastomeric properties are undesirable from heat resistance points of view and, therefore, the upper limit is generally 8 mass %, preferably 6 mass %. When PPVE is used as PFVE, the upper limit is generally7 mass %, preferably 6mass %.

In this specification, the expression "have not less than 3.5 mass % of the PFVE unit" means that, of the above-mentioned molecular structure in the copolymer (A), the mass (%) of the part derived from PFVE relative to the mass per molecule of said copolymer (A) is not less than 3.5% on the average.

In this specification, the above-mentioned definitions of "monomer unit" and "mol % or mass % of monomer units in a copolymer" apply equally to any monomer other than TFE and PFVE and any copolymer other than copolymer (A) as well.

The above-mentioned copolymer (A) is a copolymer having a melting point of not less than 295° C. When the ozone-resistant molding material (I) of the present invention is applied to a semiconductor production process which is a principal application of the present invention, it is required for heat resistance at not less than 100° C., preferably at not less than 150° C. Moreover, the melting point of the copolymer (A) varies with the PFVE unit content; thus the higher is the PFVE unit content, the lower is the melting point. Therefore, the above-mentioned lower limit of melting point, namely 295° C., may be said to be a factor defining the upper limit of the PFVE unit content. The preferred lower limit is 298° C.

The melting point with the PFVE unit content of 3.5 mass % varies with species of PFVE but is usually 310° C.

In this specification, melting points are the values measured with a differential scanning colorimeter [DSC] as will be described hereinafter. In measuring the melting point of said copolymer (A), the copolymer (A) or a ozone-resistant molding material (I) comprising the copolymer (A) may be used as a test material, for since the ozone-resistant molding material (I) of the present invention is predominantly composed of copolymer (A), the value measured for the ozone-resistant molding material (I) is substantially equal to the value measured for the copolymer (A).

The ozone-resistant molding material (II) of the present invention comprises copolymer (B), and the above-mentioned copolymer (B) is a copolymer comprising TFE and PPVE.

The above-mentioned copolymer (B) is a copolymer comprising TFE and PPVE as mentioned above, and the above-mentioned copolymer comprising TFE and PPVE is a copolymer substantially composed of TFE and PPVE. The copolymer (B) may have a monomer unit derived from other copolymerizable monomers than TFE and PPVE units in a proportion of not more than 5 mol %, unless the properties of copolymer (B) are materially affected.

The above-mentioned copolymer (B) has 3.5–6 mass % of PPVE unit. If this proportion is less than 3.5 mass %, the ozone crack resistance sought by the present invention cannot be obtained, although mechanical strength and heat resistance are improved. The preferred proportion is over 4 mass %. The upper limit is generally 7 mass % but from heat resistance points of view, it is preferably 6 mass %.

The melting point of copolymer (B) can be delineated by the above-mentioned upper limit of PPVE content.

The properties shared by said copolymer (A) and copolymer (B) in common are now described in detail.

The above-mentioned copolymer (A) and copolymer (B) are copolymers showing melt flow rate [MFR] values from 0.1 to 50 g/10 minutes. The MFR is an index of melt-moldability and good moldability can be obtained within the above-mentioned range. The preferred lower limit is 0.5 g/10 minutes and the preferred upper limit is 40 g/10 minutes. Moreover, the MFR value is a factor affecting the folding endurance to be described hereinafter.

In this specification, all MFR values mentioned are the values determined in accordance with ASTM D 2116- 81 as will be described hereinafter. The ozone-resistant molding material (I) and ozone-resistant molding material (II) according to the present invention are predominantly composed of said copolymer (A) and copolymer (B) respectively, and therefore the MFR of said copolymer (A) and the MFR of said copolymer (B) are substantially equivalent to the MFR of ozone-resistant molding material (I) and the MFR of ozone-resistant molding material (II), respectively. The MFR values respectively determined by the same method as above for a cut sample of the molded article obtained from said ozone-resistant molding material (I) and a cut sample of the molded article obtained from said ozone-resistant molding material (II) may be used as the MFR of said copolymer (A) and the MFR of said copolymer (B), respectively.

The above-mentioned copolymer (A) is a polymer in which unstable terminal groups amount to not more than 50 per $1\times10^6$ carbon atoms and the above-mentioned copolymer (B) is a polymer in which unstable terminal groups amount to not more than 50 per $1\times10^6$ carbon atoms. The above-mentioned number of unstable terminal groups serves not only as an index of the degree of stabilization of copolymer (A) or copolymer (B) but also as an index of the degree of decomposition or vaporization of the various impurities, such as residues of the polymerization initiator, residues of the chain transfer agent, and even low molecular compounds, which are unavoidably present in copolymer (A) or (B) to act as factors inducing ozone cracks, or the degree of stabilization against ozone. Stated differently, the copolymer (A) with the number of unstable terminal groups amounting to not more than 50 per $1\times10^6$ carbon atoms and the copolymer (B) with the number of unstable terminal groups amounting to not more than 50 per $1\times10^6$ carbon atoms is indicative of a successful reduction in the amount of impurities which are causative of ozone cracks in said ozone-resistant molding material (I) or ozone-resistant molding material (II) as the case may be.

In connection with the ozone-resistant molding material (I) of the present invention and the ozone-resistant molding material (II) of the present invention, the above-mentioned approach (2), that is the approach toward minimizing the evolution of gases, can be implemented by insuring that the number of unstable terminal groups will not be more than 50 per $1\times10^6$ carbon atoms in copolymer (A) or the number of unstable terminal groups will not be more than 50 per $1\times10^6$ carbon atoms in copolymer (B). The preferred upper limit is 20 per $1\times10^6$ carbon atoms and the more preferred upper limit is 5 per $1\times10^6$ carbon atoms. The unstable terminal groups mentioned above need not necessarily be present.

In this specification, the term "unstable terminal groups" means —COF, —COOH free (free COOH), —COOH bonded (associated COOH), —COOCH$_3$, —CONH$_2$, and/or —CH$_2$OH. These unstable terminal groups are ultimately converted to —CF$_3$ by the fluorine gas treatment to be described hereinafter. In this specification, the term "terminal" usually refers to the main chain terminus.

Preferably the above-mentioned copolymer (A) or copolymer (B) each is obtained by subjecting said perfluoro-copolymer (a) or perfluoro-copolymer (b) to the fluorine gas treatment described hereinafter. The perfluoro-copolymer (a) is a perfluoro-copolymer in which unstable terminal groups amount to not less than 60 per $1\times10^6$ carbon atoms. The perfluoro-copolymer (b) is a perfluoro-copolymer in which unstable terminal groups amount to not less than 60 per $1\times10^6$ carbon atoms.

The above-mentioned perfluoro-copolymer (a) is not particularly restricted provided that the unstable terminal groups amount to not less than 60 per $1\times10^6$ carbon atoms in the copolymer (a) and that copolymer (A) is one obtained by the fluorine gas treatment described below, but it is usually a copolymer composed of monomer units same as those of copolymer (A).

The above-mentioned perfluoro-copolymer (b) is not particularly restricted provided that unstable terminal groups amount to not less than 60 per $1\times10^6$ carbon atoms in the copolymer (b) and that copolymer (B) is one obtained by the fluorine gas treatment described below, but it is usually a copolymer composed of monomer units same as those of copolymer (B).

The method of reducing the number of unstable terminal groups in said perfluoro-copolymer (a) and the unstable terminal groups in said perfluoro-copolymer (b) is not particularly restricted but includes a fluorine gas treatment, a heat treatment, and a supercritical gas extraction treatment, among others. Partly because of its high processing efficiency and partly because of its feasibility of converting said unstable terminal groups at least partly or totally to —CF$_3$ groups which are stable terminal groups, the fluorine gas treatment is preferred.

The above-mentioned fluorine gas treatment is carried out on the perfluoro-copolymer (a) and perfluoro-copolymer (b). As the perfluoro-copolymer (a) or perfluoro-copolymer (b) is subjected to said fluorine gas treatment, the number of its unstable terminal groups per $1\times10^6$ carbon atoms is decreased to not more than 50.

The above-mentioned fluorine gas treatment can be effected by causing fluorine gas to contact each of said perfluoro-copolymer (a) and perfluoro-copolymer (b). This fluorine gas treatment may be carried out on the copolymer in the powder form or on the copolymer in the pellet form. The treatment of the powdery copolymer is advantageous for removal of the impurities unavoidably infiltrated or contaminated into the perfluoro-copolymer (a) or perfluoro-copolymer (b) in the course of its production, particularly hydrocarbon compounds. The treatment of the pelletized copolymer is advantageous for removal of the thermal degradation products formed by melting a powder of perfluoro-copolymer (a) or perfluoro-copolymer (b) to each pellet form. Therefore, for the purpose of minimizing the impurities in the ozone-resistant molding material (I) of the present invention and ozone-resistant molding material (II) of the present invention, the above-mentioned treatment is preferably carried out on both the powdery copolymer and the pelletized copolymer.

The reaction between fluorine gas and an organic matter is a violent exothermic reaction and, therefore, in order to avoid hazards and control the reaction, it is preferable to use fluorine gas after diluting with an inert gas such as nitrogen gas or argon gas. The appropriate concentration of fluorine gas is about 10–25 mass %. The fluorine gas treatment comprises bringing the above-mentioned diluted fluorine gas into contact with each of the perfluoro-copolymer (a) and perfluoro-copolymer (b) at 100–250° C. The preferred lower limit of temperature for said fluorine gas treatment is 120° C. and the preferred upper limit is 250° C. The duration of fluorine gas treatment is usually 3–16 hours; the preferred lower limit is 4 hours and the preferred upper limit is 12 hours. The fluorine gas treatment may be carried out under pressure but it is preferably effected by introducing a diluted fluorine gas continuously or intermittently over the perfluoro-copolymer (a) or perfluoro-copolymer (b) placed in a reaction vessel at atmospheric pressure. Furthermore, by carrying out a gaseous ammonia treatment following said fluorine gas treatment, the residual —COF groups, if any, may be converted to the more stable —CONH$_2$ groups.

For the above-mentioned stabilization of unstable terminal groups with fluorine gas treatment, the method described in Japanese Kokoku Publication Hei-4-83 may for example be employed. However, this publication does not mention at all reductions in the amount of internal impurities in a molding material or ozone crack resistance. In other words, the above-mentioned publication does not disclose any molding material providing for good ozone crack resistance.

When the heat treatment mentioned above is selected as the method of reducing the number of unstable terminal groups, a wet heat treatment can be carried out in the presence of water vapor at a high temperature of not less than 100° C. When the unstable terminal groups are stabilized by the above-mentioned heat treatment, the carboxyl group-derived unstable terminal groups are converted to comparatively stable —CF$_2$H groups. While the above-mentioned heat treatment can be carried out in an independent step, it may be optionally carried out in an extruder at pelletization. However, the heat treatment is less efficient than said fluorine gas treatment, and it is necessary to add an alkali metal salt abhorred in semiconductor production processes in order to enhance the efficiency of treatment. Therefore, the fluorine gas treatment is preferred as the method of reducing the number of unstable terminal groups.

The copolymer (A) and copolymer (B) preferably have MIT values satisfying the following formula (1)

$$(MIT \text{ value}) \geq [7 \times 10^6 \times (MFR)^{-2}] \quad (1)$$

The above-mentioned MIT value is an index of folding endurance.

The above-mentioned MIT value is dependent on molecular weight. The higher the molecular weight is, the larger is the MIT value, resulting not only in a greater crack resistance to dynamic stress but also in a greater crack resistance to ozone. However, as far as the above-mentioned copolymer (A) and copolymer (B) are concerned, the usually the higher the molecular weight is, the lower is the melt fluidity and, hence, the worse is the melt moldability. Therefore, the inventors of the present invention performed experimental investigations into the relationship of MIT and MFR which is an index of melt fluidity and found that when, as determined for the ozone-resistant molding material (I) or ozone-resistant molding material (II), MFR is within the above-mentioned range and, at the same time, MIT satisfies the above-mentioned general formula (1), an excellent crack resistance is obtained without compromising melt processability. The upper limit of MIT is determined by the lower limit of melting point of said copolymer (A) or copolymer (B) or by the upper limit of PFVE unit content or the upper limit of PPVE unit content.

In this specification, all MIT values are the values determined by measurements according to ASTM D 2176-69. The MIT value of said copolymer (A) and the MIT value of said copolymer (B) are the values determined by the measurement on a molded article as prepared from said ozone-resistant molding material (I) and a molded article as prepared from said ozone-resistant molding material (II), respectively. Since the ozone-resistant molding material (I) and ozone-resistant molding material (II) according to the present invention are predominantly composed of said copolymer (A) and copolymer (B), respectively, the MIT value of the copolymer (A) and the MIT value of the copolymer (B) are substantially equivalent to the MIT value of the ozone-resistant molding material (I) and the MIT value of the ozone-resistant molding material (II), respectively. The MIT values similarly found for a sample cut out of a molded article prepared from said ozone-resistant molding material (I) and a sample cut of a molded article prepared from said ozone-resistant molding material (II) may be used as the MIT value of the above-mentioned copolymer (A) and the MIT value of the above-mentioned copolymer (B), respectively.

The ozone-resistant molding material (I) of the present invention and the ozone-resistant molding material (II) of the present invention have not only satisfactory heat resistance, solvent resistance and melt-processability, which are inherent properties of PFA, but also good ozone crack resistance and can be molded into a variety of molding/shaped articles required to have such characteristics. The ozone-resistant molding material (I) of the present invention and the ozone-resistant molding material (II) of the present invention can be used with great advantage especially as molding materials for ozone-resistant molding/shaped articles for use in semiconductor production processes.

The ozone-resistant molding/shaped article for semiconductor production equipments obtained by molding the above-mentioned ozone-resistant molding material (I) or the ozone-resistant molding/shaped article for semiconductor production equipments obtained by molding the above-mentioned ozone-resistant molding material (II) constitute still another aspect of the present invention.

In this specification, the term "molding/shaped article" (namely "molding article or shaped article") is intended to mean not only a complete product but also any component molded from the ozone-resistant molding material (I) or ozone-resistant molding material (II) of the present invention for constituting the whole or part of a product, thus including even liners for piping materials and vessels, among others.

The geometry of said molding/shaped article is not particularly restricted but includes a diversity of forms, for example sheet, film, rod, square bar, pipe, tube, circular vessel, rectangular vessel, and so forth, and these may be further processed into various components and products.

The molding/shaped article mentioned above is not particularly restricted but includes various molding/shaped articles destined to be exposed to ozone in use, particularly piping materials, joints, packings, valves, cocks, connectors, nuts, housings, wafer carriers, wafer boxes, beakers, filter housings, flowmeters, pumps, etc. for semiconductor production. The liners for such molding/shaped articles as well as the molding/shaped articles so lined are also included. The particularly useful applications are piping materials for semiconductor production lines and joints for semiconductor production lines. The molding materials for diaphragms, bellows and sleeves are further promising applications. These ozone-resistant molding/shaped articles according to the present invention are invariably molded articles outstanding in ozone resistance and, therefore, find application with great advantage in semiconductor equipment.

The technology of molding the ozone-resistant molding material (I) of the present invention or the ozone-resistant molding material (II) of the present invention to the above-mentioned molding/shaped articles is not particularly restricted but includes injection molding, compression molding, transfer molding, extrusion molding, and blow molding, among other methods.

The ozone-resistant molding material (I) of the present invention and the ozone-resistant molding material (II) of the present invention are preferably not formulated with additives which may cause formation of decomposition gases but in cases where special performance characteristics are required, the hitherto-known additives may be formulated in the necessary minimum proportions. Among such additives may be mentioned the spherulite micronizing agent disclosed in Japnese Kokai 2001-151971, low-molecular-weight PTFE and the like.

The ozone-resistant injection-molded article (i) of the present invention comprises a perfluororesin (hereinafter referred to perfluororesin (C)) and this perfluororesin (C) comprises a perfluoropolymer (hereinafter referred to as perfluoropolymer (c)).

The above-mentioned perfluoropolymer (c) is a copolymer having a recurring unit represented by the following general formula

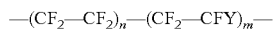
$$-(CF_2-CF_2)_n-(CF_2-CFY)_m-$$

(wherein n and m each represents an integer of not less than 1; Y represents $-OR^1$ or $-R^2$; Y may be the same or different over its m occurrences; $R^1$ and $R^2$ each represents a perfluoroalkyl group) and is usually semi-crystalline. From polymerizability points of view, $R^1$ and $R^2$ above are preferably perfluoroalkyl groups of 1–7 carbon atoms. More preferably, $R^1$ is $-CF_3$, $-C_2F_5$, $-C_3F_7$ or $-C_4F_9$ and $R^2$ is $-CF_3$, $-C_2F_5$, or $-C_3F_7$. The above-mentioned perfluoropolymer (c) is such that $-(CF_2-CF_2)-$ in the above-mentioned general formula is derived from TFE and $-(CF_2-CFY)-$ in the above-mentioned general formula is derived from a perfluoroolefin of not less than 3 carbon atoms or PFVE. The above-mentioned perfluoropolymer (c) may be a copolymer of 3 or more kinds of monomers.

The above-mentioned perfluoropolymer may have a unit derived from other copolymerizable monomers in addition to TFE units, perfluoroolefin units and PFVE units, in a proportion of not more than 5 mol %, unless the properties of perfluoropolymer (c) are materially affected.

In the case where the above-mentioned perfluoropolymer (c) is a copolymer comprising TFE and HFP, the preferred copolymer has 60–95 mass % of the TFE unit and 5–40 mass % of the HFP unit. For the TFE unit, the more preferred lower limit is 80 mass % and the still more preferred lower limit is 85mass %, while the more preferred upper limit is 92 mass % and the still more preferred upper limit is 90 mass %. For the HFP unit, the more preferred lower limit is 8 mass % and the still more preferred lower limit is 10 mass %, while the more preferred upper limit is 20 mass % and the still more preferred upper limit is 15 mass %. In addition, the perfluoropolymer (c) may have 0.5–2 mass % of the PFVE unit.

The above-mentioned perfluoropolymer (c) is preferably a copolymer comprising TFE and PFVE. The PFVE mentioned above is not particularly restricted but includes the same species as those mentioned for copolymer (A), with PPVE being particularly preferred.

When said perfluoropolymer (c) is a copolymer comprising TFE and PFVE, the preferred copolymer has not more than 99 mass % of the TFE unit and not less than 1 mass % of the PFVE unit. When PPVE is used as PFVE, the polymer preferably has 85–99mass % of the TFE unit and 1–15 mass % of the PFVE unit. For the TFE unit, the more preferred lower limit is 93 mass % and the still more preferred lower limit is 94 mass %, while the more preferred upper limit is 98 mass % and the still more preferred upper limit is 97 mass %. For the PPVE unit, the more preferred lower limit is 2 mass % and the still more preferred lower limit is 3 mass %, while the more preferred upper limit is 7 mass % and the still more preferred upper limit is 6 mass %.

The perfluororesin (C) mentioned above has an MIT value of over 200,000 cycles. If it does not exceed 200,000 cycles, the ozone resistance, such as resistance to ozone cracks, will be insufficient. The preferred value is not less than 300,000 cycles and the more preferred value is not less than 400,000 cycles. Within the above-mentioned range for MIT, the perfluororesin (C) has a folding endurance of the level to preclude the generation of ozone cracks even when its MIT value is not more than 5,000,000 cycles.

The above-mentioned perfluororesin (C) has a melting point of not lower than 230° C. If it is lower than 230° C., the resin will be deficient in heat resistance so that it cannot be used in semiconductor production equipments. The preferred lower limit is 250° C. and the more preferred lower limit is 295° C.

The ozone-resistant injection-molded article (ii) of the present invention comprises a perfluororesin (hereinafter referred to as perfluororesin (D)), and the above-mentioned perfluororesin (D) comprises a perfluoropolymer (hereinafter referred to as perfluoropolymer (d)). The above-mentioned perfluoropolymer (d) includes species same as those mentioned above for perfluoropolymer (c), preferably a copolymer comprising TFE and PFVE, and the above-mentioned PFVE is preferably PPVE.

The above-mentioned perfluororesin (D) is one having an MIT value of not less than 300,000 cycles. For use of the ozone-resistant injection-molded article (ii) of the present invention in semiconductor production equipments, the MIT value is preferably not less than 300,000 cycles. The more preferred lower limit is 400,000 cycles. Within the above-mentioned range for MIT, the perfluororesin (D) has a folding endurance of the level to preclude the generation of ozone cracks even when its MIT value is not more than 5,000,000 cycles.

The above-mentioned perfluororesin (D) has a melting point of preferably not lower than 295° C., which is not restricted to this range. For use of the ozone-resistant injection-molded article (ii) of the present invention in semiconductor production equipments, where a heat resistance at 100° C. or higher, preferably 150° C. or higher, is required, the more preferred lower limit is 298° C.

The properties shared by the ozone-resistant injection-molded article (i) of the present invention and the ozone-resistant injection molded article (ii) of the present invention in common are now described in detail.

The above-mentioned perfluoropolymer (c) is a polymer in which unstable terminal groups amount to not more than 50 per $1 \times 10^6$ carbon atoms and the perfluoropolymer (d) is a polymer in which unstable terminal groups amount to not more than 50 per $1 \times 10^6$ carbon atoms. The above-mentioned number of unstable terminal groups, just as in said copolymer (A) and copolymer (B), serves as an index of the degree of decomposition of the impurity unavoidably present in the ozone-resistant injection-molded article (i) or ozone-resistant injection-molded article (ii) of the present invention by said treatment or the degree of stabilization against ozone. The preferred upper limit is 6 per $1 \times 10^6$ carbon atoms. The unstable terminal groups may not be present. The unstable terminal groups may be similar, in kind, to the unstable terminal groups which said copolymer (A) and copolymer (B) may be possessed of.

The above-mentioned perfluoropolymer (c) and perfluoropolymer (d) are preferably the polymers obtained by subjecting to-be-treated perfluoropolymer (c1) and to-be-treated perfluoropolymer (d1), respectively, to the fluorine gas treatment described hereinafter. The above-mentioned to-be-treated perfluoropolymer (c1) is a perfluoropolymer in which unstable terminal groups amount to not less than 60 per $1 \times 10^6$ carbon atoms. The above-mentioned perfluoropolymer (d1) is a perfluoropolymer in which unstable terminal groups amount to not less than 60 per $1 \times 10^6$ carbon atoms.

The to-be-treated perfluoropolymer (c1) is not particularly restricted provided that unstable terminal groups amount to not less than 60 per $1 \times 10^6$ carbon atoms therein and that perfluoropolymer (c) is one obtained by the fluorine gas treatment described below, but it is usually a copolymer composed of the same monomer units as perfluoropolymer (c).

The above-mentioned to-be-treated perfluoropolymer (d1) is not particularly restricted provided that unstable terminal groups amount to not less than 60 per $1 \times 10^6$ carbon atoms therein and that perfluoropolymer (d) is one obtained by the fluorine gas treatment described below, but it is usually a copolymer composed of the same monomer units as said perfluoropolymer (d)

The technology for reducing the number of unstable terminal groups in said to-be-treated perfluoropolymer (c1) or the number of unstable terminal groups in said to-be-treated perfluoropolymer (d1) is not particularly restricted but may for example include the same method as the above-described method of reducing the number of unstable terminal groups in said copolymer (A) and copolymer (B), although the fluorine gas treatment is preferred.

The above-mentioned fluorine gas treatment is applied to the to-be-treated perfluoropolymer (c1) and to-be-treated perfluoropolymer (d1) and can be carried out in the same manner as said fluorine gas treatment of perfluoro-copolymer (a) and perfluoro-copolymer (b). By this fluorine gas treatment, the number of unstable terminal groups in said to-be-treated fluoropolymer (c1) or said to-be-treated perfluoropolymer (d1) can be decreased to not more than 50 per $1 \times 10^6$ carbon atoms in the corresponding perfluoropolymer.

The above-mentioned perfluororesin (C) and perfluororesin (D) each preferably has an MFR value of 1–30 g/10 minutes. If the value is less than 1 g/10 minutes, the resins can hardly be injection-molded. As far as the MFR value is within the above-mentioned range, good injection-moldability can be expected. The preferred lower limit is 4 g/10 min. and the preferred upper limit is 10 g/10 min.

Because the perfluororesin (C) and perfluororesin (D) have excellent ozone resistance as mentioned above, both the ozone-resistant injection-molded article (i) of the present invention and the ozone-resistant injection-molded article (ii) of the present invention can be used with advantage as injection-molded articles required to have ozone resistance.

In this specification, the "ozone-resistant injection-molded article (i)" and "ozone-resistant injection-molded article (ii)" are not particularly restricted provided that such molding/shaped articles are those obtained by injection molding, thus including not only complete products but also molding/shaped articles which are either wholly or partly made of perfluororesin (C) or perfluororesin (D), such as lined piping materials and housings.

The geometry of the ozone-resistant injection-molded article (i) or ozone-resistant injection-molded article (ii) of the present invention is not particularly restricted but includes the same forms as mentioned for said ozone-resistant molding/shaped articles, and these molded articles can be used as they are or further processed to manufacture various components and products.

The ozone-resistant injection-molded article (i) of the present invention and the ozone-resistant injection-molded article (ii) of the present invention are not particularly restricted but include molding/shaped articles same as said ozone-resistant molding/shaped articles and can be used with advantage particularly as a piping material for semiconductor production equipments and a joint for semiconductor production equipments. The ozone-resistant injection-molded article (i) of the present invention and the ozone-resistant injection-molded article (ii) of the present invention may each be a component of a piping material for semiconductor production equipments or a component of a joint for semiconductor production equipments.

The injection-molding materials of the present invention are used in the production of said ozone-resistant injection-molded article (i) and said ozone-resistant injection-molded article (ii).

The injection-molding materials of the present invention is preferably not formulated with additives liable to generate decomposition gases, but the above-mentioned additives allowed to be formulated in said ozone-resistant molding material (I) and ozone-resistant molding material (II) can be similarly formulated. The injection-molding materials of the present invention have the satisfactory heat resistance and solvent resistance which are inherent in fluororesins but also good ozone resistance and can be molded into the ozone-resistant injection-molded article (i) and ozone-resistant injection-molded article (ii) which are required to have these characteristics. The injection-molding materials of the present invention can be used as injection-molding materials, thanks to the excellent melt-moldability of said perfluororesin (C) and perfluororesin (D).

With regard to the various parameters used for identification of the ozone-resistant molding material (I), ozone-resistant molding material (II), ozone-resistant injection-molded article (i), and ozone-resistant injection-molded article (ii), the methods of measuring the respective parameters are described below. The data given in Examples and Comparative Examples were determined by these methods.

(PFVE Unit Content)

The PFVE unit content is determined by $^{19}$F-NMR spectrometery.

(Melting Point)

A 3-mg sample is used for measurement with a differential scanning calorimeter [DSC] (™RDC220, manufactured by Seiko Electronics Co.). First, the temperature is increased from 200° C. to 350° C. at a rate of 10° C./min., held at 350° C. for 1 min., decreased to 200° C. at a rate of 10° C./min., held at 200° C. for 1 minute, and increased again to 350° C. at a rate of 10° C./min. From the DSC curve thus obtained, the melting peak temperature (Tm) is determined and taken as the melting point of the sample.

(MFR)

In conformity with ASTM D2116-81, the melt flow rate is measured at a temperature of 372° C. under a load of 5 kg.

(Number of Unstable Terminal Groups)

Each sample is compression-molded at 350° C. to prepare a film with a thickness of 0.25–0.3mm. Using a Fourier transform infrared spectroscope [FT-IR] (™1760X, manufactured by Perkin-Elmer Co.), the above-mentioned film is scanned 40 times and analyzed to determine an infrared absorption spectrum and a difference spectrum with respect to a base spectrum corresponding to complete fluorination and absence of any unstable terminal group is obtained. From the absorption peaks of given terminal groups on this difference spectrum, the parameter N, i.e. the number of terminal groups per $1 \times 10^6$ carbon atoms in the sample, is calculated by means of the following equation (2).

$$N = I \times K / t \tag{2}$$

I: absorbance

K: correction factor

T: film thickness (mm)

For reference's sake, the absorption frequency, molar extinction coefficient, and correction factor values of the unstable terminal groups mentioned in this specification are presented in Table 1. The molar extinction coefficient values are determined from the FT-IR data on the low molecular model compounds.

TABLE 1

| Unstable terminal group | Absorption frequency (cm$^{-1}$) | Molar extinction coefficient (l/cm/mol) | Correction factor | Model compound |
|---|---|---|---|---|
| COF | 1883 | 600 | 388 | $C_7F_{15}COF$ |
| COOH free | 1815 | 530 | 439 | $H(CF_2)_6COOH$ |
| COOH bonded | 1779 | 530 | 439 | $H(CF_2)_6COOH$ |
| COOCH$_3$ | 1795 | 680 | 342 | $C_7F_{15}COOCH_3$ |
| CONH$_2$ | 3436 | 506 | 460 | $C_7F_{15}CONH_2$ |
| CH$_2$OH | 3648 | 104 | 2236 | $C_7F_{15}CH_2OH$ |

(MIT Value)

In conformity with ASTM D 2176-69 and using a MIT folding endurance tester (manufactured by Toyo Seiki Seisakusho), a sample cut out of a compression-molded film with a thickness of 0.20–0.23 mm is measured under a load of 12.15 N (1.25 kgf), a flex rate of 178 cycles/min., and a flex angle of 1350.

BEST MODE FOR CARRYING OUT THE INVENTION

The following examples are further illustrative of the present invention but are by no means definitive of the scope of the present invention. In the following description, all "parts" are "parts by mass".

SYNTHESIS EXAMPLE 1

A stirrer-equipped jacket-type autoclave having a water holding capacity of 174 parts was charged with 26.6 parts of decarbonated/demineralized water. After sufficient purging with pure nitrogen gas, a vacuum was established in the autoclave and the autoclave was charged with 30.4 parts of perfluorocyclobutane (hereinafter, referred to as "C-318"), 2.2 parts of methanol as a chain transfer agent, and 1.2 parts of PPVE. Then, under constant stirring and with the interior temperature of the autoclave being maintained at 35° C., TFE was pressure-fed until an internal pressure of 0.58 MPaG was established. Then, 0.022 part of di-n-propyl peroxydicarbonate (hereinafter, referred to as, NPP) was added as a polymerization initiator to start the polymerization. With the progress of polymerization, the internal pressure of the autoclave dropped and, therefore, TFE was pressure-fed to the autoclave so as to maintain its internal pressure at 0.58 MPaG. In addition, PPVE was supplementally added as needed for insuring to even mix polymer composition.

At 7.4 hours after the start of polymerization, the stirring was stopped and, at the same time, the unreacted monomers and C-318 were discharged to terminate the polymerization. The white powder in the autoclave was rinsed with water and dried at 150° C. for 12 hours to harvest the product polymer.

This product polymer was melt-extruded using a screw extruder (™PCM46, manufactured by Ikegai) at 360° C. to prepare pellets.

Using the pellets obtained, the copolymer composition, melting point, MFR, and the number of unstable terminal groups per 10$^6$ carbon atoms of the polymer product were determined. The results were as follows.

Copolymer composition (mass %): TFE/PPVE=95.8/4.2 Melting point: 305.3° C. MFR: 15.8 g/10 min. Number of unstable terminal groups: a total of 297 —CH$_2$OH=187, —COF=33, —COOCH$_3$=45, —COOH free=16, —COOH bonded=16, —CONH$_2$=0

SYNTHESIS EXAMPLE 2

Except that, prior to the start of polymerization reaction, the charging amount of methanol was changed to 1.0 part, the amount of PPVE to 1.4 parts, and the amount of NPP to 0.014 part, the reaction was conducted for 31.4 hours in the same manner as in Synthesis Example 1, and then similarly rinsed and dried to recover a polymer product, which was then pelletized to give pellets.

Using the pellets thus obtained, the copolymer composition, melting point, MFR, and the number of unstable terminal groups per 10$^6$ carbon atoms were determined. The results are shown below.

Copolymer composition (mass %): TFE/PPVE=94.5/5.5 Melting point: 300.9° C. MFR: 14.6 g/10 min. Number of unstable terminal groups: a total of 182 —CH$_2$OH=100, —COF=29, —COOCH$_3$=44, —COOH free=8, —COOH bonded=1, —CONH$_2$=0

SYNTHESIS EXAMPLE 3

Except that, prior to the start of polymerization reaction, the charging amount of methanol was changed to 2.3 part, the amount of PPVE to 0.9 part, and the amount of NPP to 0.021 part, the reaction was conducted for 7.1 hours in the same manner as in Synthesis Example 1, and then similarly rinsed and dried to recover a polymer product, which was then pelletized to give pellets.

Using the pellets thus obtained, the copolymer composition, melting point, MFR, and the number of unstable terminal groups per 10$^6$ carbon atoms were determined. The results are shown below.

Copolymer composition (mass %): TFE/PPVE=96.7/3.3 Melting point: 309.5° C. MFR: 15.2 g/10 min. Number of unstable terminal groups: a total of 314 —CH$_2$OH=157, —COF=59, —COOCH$_3$=34, —COOH free=39, —COOH bonded=25, —CONH$_2$=0

EXAMPLE 1

The pellets obtained in Synthesis Example 1 were placed in a vessel and fluorine gas diluted to 20 mass % with nitrogen gas in advance was passed at 200° C. under atmospheric pressure for 10 hours for fluorine gas treatment.

Using the pellets thus obtained, the copolymer composition, melting point, MFR, number of unstable terminal groups per 10$^6$ carbon atoms, and MIT were determined. The results are as shown below.

Copolymer composition (mass %): TFE/PPVE =95.8/4.2 Melting point: 305.3° C. MFR: 16.2 g/10 min. Number of unstable terminal groups: not detectable (total<1) MIT (found): 2371 g The fluorine gas-treated pellets were compression-molded at 350° C. under a pressure of 0.44 MPaG to prepare a 1 mm-thick sheet and samples sized 10×20 mm were cut out for use as samples for measurements of resistivity to ozone.

(Resistivity to Ozone)

The ozone gas (ozone/oxygen=10/90, vol. %) generated with an ozone generator (™SGX-A11MN (new name), manufactured by Sumitomo Seiki Kogyo Co.) was bubbled through deionized water in a PFA vessel for addition of water vapor to the ozone gas and passed to a PFA cell containing the test sample at a rate of 0.7 L/min. at room temperature for exposure of the sample to the wet ozone gas. At 60 days, 90 days, and 120 days of exposure, the sample was taken out and after the surface was lightly rinsed with deionized water, the part of the sample at a depth of 5–200 μm from the surface was observed under a transmission light microscope at ×100 magnification and photographed together with a standard scale and the number of cracks not less than 10 μm in length per mm² of the sample surface was determined.

The evaluation criteria used are as follows.
A: The number of cracks≦10
B: 10<the number of cracks≦50
C: 50<the number of cracks≦100
D: The number of cracks>100

The results are presented in Table 2.

COMPARATIVE EXAMPLE 1

Except that the pellets obtained in Synthesis Example 1 were used without fluorine gas treatment, the measurement of MIT, preparation of samples for measurements of resistivity to ozone, and the resistivity to ozone was measured in the same manner as in Example 1. The results are presented in Table 2.

EXAMPLE 2

Except that the pellets obtained in Synthesis Example 2 were used, a fluorine gas treatment was carried out in the same manner as in Example 1 to prepare fluorine gas-treated pellets. Using the pellets thus obtained, the copolymer composition, melting point, MFR, and number of unstable terminal groups per $10^6$ carbon atoms were determined. The results are presented below.

Copolymer composition (mass %): TFE/PPVE=94.5/5.5 Melting point: 300.9° C. MFR: 15.0 g/10 min. Number of unstable terminal groups: not detectable (total<1) MIT (found): 93722

Furthermore, samples for measurements of resistivity to ozone were prepared and the resistivity to ozone was measured as in Example 1. The results are presented in Table 2.

EXAMPLE 3

The pellets obtained in Synthesis Example 2 were placed in a vessel and subjected to a fluorine gas treatment by introducing fluorine gas diluted to 20 mass % concentration with nitrogen gas in advance at 120° C. under atmospheric pressure for 7 hours. Then, gaseous ammonia at 70° C. was passed for 5 hours.

Using the pellets obtained, the copolymer composition, melting point, MFR, and number of unstable terminal groups per $10^6$ carbon atoms were determined. The results are presented below.

Copolymer composition (mass %): TFE/PPVE=94.5/5.5 Melting point: 300.9° C. MFR: 14.8 g/10 min. Number of unstable terminal groups: a total of 28 —CH$_2$OH=0, —COF=0, —COOCH$_3$=0, —COOH free=0, —COOH bonded=0, —CONH$_2$=28 MIT (found): 95613

Furthermore, samples for measurements of resistivity to ozone were prepared and the resistivity to ozone was measured as in Example 1. The results are presented in Table 2.

COMPARATIVE EXAMPLE 2

Except that the pellets obtained in Synthesis Example 2 were used without fluorine gas treatment, the measurement of MIT, preparation of samples for measurements of resistivity to ozone, and the resistivity to ozone was measured in the same manner as in Example 1. The results are presented in Table 2.

COMPARATIVE EXAMPLE 3

Except that the pellets obtained in Synthesis Example 3 were used without fluorine gas treatment, the measurement of MIT, preparation of samples for measurements of resistivity to ozone, and the resistivity to ozone was measured in the same manner as in Example 1. The results are presented in Table 2.

EXAMPLE 4

Using the pellets treated with fluorine gas in Example 3 and an injection molding machine (™SG50, manufactured by Sumitomo Jūki Co.), box nuts with a minimum outer diameter of 43 mm, an inner diameter of 27.02 mm, and a height of 30 mm were manufactured by injection molding.

Cylinder temperature: C1=360° C., C2=380° C., C3=400° C. Nozzle temperature: 400° C. Die temperature: 200° C. Hold pressure: 49 MPa (500 kgf/cm²) Detention time: 20 sec. Injection speed: 3 g/sec.

The box nuts obtained were subjected to measurements of resistivity to ozone as in Example 1, and after 60 days, 90 days, and 120 days of exposure, the cracks on the flat peripheral surface of each nut were examined and rated as in Example 1. The results are presented in Table 2.

COMPARATIVE EXAMPLE 4

Except that the pellets obtained in Synthesis Example 3 were used without fluorine gas treatment, the MIT value was determined in the same manner as in Example 1. In addition, as in Example 4, samples for measurements of resistivity to ozone were prepared and resistivity to ozone was masured. The results are presented in Table 2.

TABLE 2

| | Copolymer | PPVE content (wt. %) | Melting point (° C.) | MFR (g/10 min.) | MIT (found) | Fluorine gas treatment | Total number of unstable terminal groups (per $10^6$ C atoms) | Resistivity to ozone 60 days | 90 days | 120 days |
|---|---|---|---|---|---|---|---|---|---|---|
| Ex. 1 | Synthesis Ex. 1 | 4.2 | 305.3 | 16.2 | 23718 | 200° C. × 10 H | Below 1 | A | — | — |
| Comparative Ex. 1 | Synthesis Ex. 1 | 4.2 | 305.3 | 15.8 | 24521 | Untreated | 297 | D | — | — |

TABLE 2-continued

| Copolymer | | PPVE content (wt. %) | Melting point (° C.) | MFR (g/10 min.) | MIT (found) | Fluorine gas treatment | Total number of unstable terminal groups (per $10^6$ C atoms) | Resistivity to ozone | | |
|---|---|---|---|---|---|---|---|---|---|---|
| | | | | | | | | 60 days | 90 days | 120 days |
| Ex. 2 | Synthesis Ex. 2 | 5.5 | 300.9 | 15.0 | 93722 | 200° C. × 10 H | Below 1 | A | — | — |
| Ex. 3 | Synthesis Ex. 2 | 5.5 | 300.9 | 14.8 | 95613 | 120° C. × 7 H | 28 | A | — | — |
| Comparative Ex. 2 | Synthesis Ex. 2 | 5.5 | 300.9 | 14.6 | 96721 | Untreated | 182 | D | — | — |
| Comparative Ex. 3 | Synthesis Ex. 3 | 3.3 | 309.5 | 15.2 | 14872 | Untreated | 314 | D | — | — |
| Ex. 4 | Synthesis Ex. 2 | 5.5 | 300.9 | 14.8 | 95613 | 120° C. × 7 H | 28 | A | B | C |
| Comparative Ex. 4 | Synthesis Ex. 3 | 3.3 | 309.5 | 15.2 | 14872 | Untreated | 314 | C | D | D |

The data in Table 2 indicate that whereas Examples 1–4 involving comparatively few unstable terminal groups developed substantially no cracks in the measurements of resistivity to ozone, Comparative Examples 1–4 involving comparatively many unstable terminal groups developed cracks.

SYNTHESIS EXAMPLE 4

A stirrer-equipped jacket-type autoclave having a water holding capacity of 174 parts was charged with 26.6 parts of decarbonated/demineralized water. After sufficient purging with pure nitrogen gas, a vacuum was established in the autoclave and 30.4 parts of C-318, 0.6 part of methanol as a chain transfer agent, and 1.4 parts of PPVE were introduced into the autoclave. Then, under constant stirring and with the internal temperature of the autoclave being maintained at 35° C., TFE was pressure-fed until an internal pressure of 0.58 MPaG was attained. As a polymerization initiator, 0.014 part of NPP was then added and the polymerization reaction was started. As the internal pressure of the autoclave would drop with the progress of polymerization, TFE was further pressure-fed so as to maintain the internal pressure at 0.58 MPaG. For insuring a homogeneous polymer composition, PPVE was further added as needed.

At 8 hours of polymerization, the stirring was stopped and the unreacted monomers and C-318 were discharged to terminate the polymerization. The white powder in the autoclave was rinsed with water and dried at 150° C. for 12 hours to recover the product polymer.

The product polymer thus obtained was melt-extruded with a screw extruder (™PCM46, manufactured by Ikegai) at 360° C. to prepare pellets.

Using the pellets obtained, the copolymer composition, melting point, MFR, number of unstable terminal groups per $10^6$ carbon atoms, and MIT were determined. The results are presented below.

Copolymer composition (mass %): TFE/PPVE=94.5/5.5 Melting point: 301.8° C. MFR: 6.8 g/10 min. Number of unstable terminal groups: a total of 235 —$CH_2OH$=150, —COF=28, —$COOCH_3$=35, —COOH free=12, —COOH bonded=10, —$CONH_2$=0 MIT (found): 419000

EXAMPLE 5

The pellets obtained in Synthesis Example 4 were placed in a vessel and subjected to a fluorine gas treatment by introducing fluorine gas diluted to 20 mass % concentration with nitrogen gas in advance at 120° C. under atmospheric pressure for 7 hours. Then, gaseous ammonia was passed at 70° C. for 5 hours.

Using the pellets thus obtained, the copolymer composition, melting point, MFR, number of unstable terminal groups per $10^6$ carbon atoms, and MIT were determined. The results are presented below.

Copolymer composition (mass %): TFE/PPVE=94.5/5.5 Melting point: 301.8° C. MFR: 6.4 g/10 min. Number of unstable terminal groups: a total of 22 —$CH_2OH$=0, —COF=0, —$COOCH_3$=0, —COOH free=0, —COOH bonded=0, —$CONH_2$=22 MIT (found): 427000

Furthermore, as in Example 4, samples for measurements of resistivity to ozone were prepared and the resistivity to ozone was measured. The results are presented in Table 3.

EXAMPLE 6

The pellets obtained in Synthesis Example 4 were placed in a vessel and subjected to a fluorine gas treatment by introducing fluorine gas diluted to 20 mass % with nitrogen gas in advance at 200° C. under atmospheric pressure for 10 hours.

Using the pellets thus obtained, the copolymer composition, melting point, MFR, number of unstable terminal groups per $10^6$ carbon atoms, and MIT were determined. The results are presented below.

Copolymer composition (mass %): TFE/PPVE=94.5/5.5 Melting point: 301.8° C. MFR: 6.9 g/10 min. Number of unstable terminal groups: not detectable (total<1) MIT (found): 415000

Samples for measurements of resistivity to ozone were prepared and subjected to measurements of resistivity to ozone in the same manner as in Example 4. The results are presented in Table 3.

SYNTHESIS EXAMPLE 5

Except that the charging amount of methanol was changed to 0.4 part, the charging amount of PPVE to 0.9 part, and the charging amount of NPP to 0.013 part before the start of polymerization, the reaction was conducted for 7 hours in otherwise the same manner as in Synthesis Example 4. The resulting polymer was similarly rinsed with water, dried, and pelletized.

Using the resulting pellets, the copolymer composition, melting point, MFR, and number of unstable terminal groups per $10^6$ carbon atoms were determined. The results are presented below.

Copolymer composition (mass %): TFE/PPVE=96.7/3.3 Melting point: 309.7° C. MFR: 6.5 g/10 min. Number of unstable terminal groups: a total of 241 —CH$_2$OH=145, —COF=30, —COOCH$_3$=45, —COOH free=13, —COOH bonded=8, —CONH$_2$=0

COMPARATIVE EXAMPLE 5

The pellets obtained in Synthesis Example 5 were placed in a vessel and subjected to a fluorine gas treatment by introducing fluorine gas diluted to 20 mass % concentration with nitrogen gas in advance at 200° C. under atmospheric pressure for 10 hours.

Using the pellets obtained, the copolymer composition, melting point, MFR, number of unstable terminal groups per $10^6$ carbon atoms, and MIT were determined. The results are presented below.

Copolymer composition (mass %): TFE/PPVE=96.7/3.3 Melting point: 309.7° C. MFR: 6.7 g/10 min. Number of unstable terminal groups: not detectable (total<1) MIT (found): 178000

Samples for measurements of resistivity to ozone were prepared and subjected to measurements of resistivity to ozone in the same manner as in Example 4. The results are presented in Table 3.

COMPARATIVE EXAMPLE 6

Using the pellets obtained in Synthesis Example 4 directly as they were, samples for measurements of resistivity to ozone were prepared and subjected to measurements of resistivity to ozone in the same manner as in Example 4. The results are presented in Table 3.

molding materials according to the present invention, each as constituted above, enable production of molded articles having high degrees of ozone resistance, particularly the piping materials and joints for semiconductor production equipments.

The invention claimed is:

1. A molding material for ozone-resistant molding/shaped articles comprising a copolymer (A) and having a melt flow rate of 0.1–50 g/10 min.
   wherein said copolymer (A) is a copolymer comprising tetrafluoroethylene and a perfluorovinylether with the total of tetrafluoroethylene and the perfluorovinylether units accounting for not less than 95 mol % of all the monomer units, and has not less than 3.5 mass of a perfluorovinylether unit, a melting point in the range of not less than 295° C. to not more than 310° C., and not more than 50 of unstable terminal groups per $1 \times 10^6$ carbon atoms in said copolymer (A).

2. The molding material for ozone-resistant molding/shaped articles according to claim 1
   wherein the copolymer (A) is one obtained by subjecting a perfluoro-copolymer (a) to a fluorine gas treatment and
   said perfluoro-copolymer (a) has not less than 60 of unstable terminal groups per $1 \times 10^6$ carbon atoms in said perfluoro-copolymer (a).

3. The molding material for ozone-resistant molding/shaped articles according to claim 1
   wherein unstable terminal groups amount to not more than 20 per $1 \times 10^6$ carbon atoms in the copolymer (A).

4. The molding material for ozone-resistant molding/shaped articles according to claim 1
   wherein unstable terminal groups amount to not more than 5 per $1 \times 10^6$ carbon atoms in the copolymer (A).

TABLE 3

| | Copolymer | PPVE content (wt. %) | Melting point (° C.) | MFR (g/ 10 min.) | MIT (found) | Fluorine gas treatment | Total number of unstable terminal groups (per $10^6$ C atoms) | Resistivity to ozone 60 days | 90 days | 120 days |
|---|---|---|---|---|---|---|---|---|---|---|
| Ex. 5 | Synthesis Ex. 4 | 5.5 | 301.8 | 6.4 | 427000 | 120° C. × 7 H | 22 | A | A | A |
| Ex. 6 | Synthesis Ex. 4 | 5.5 | 301.8 | 6.4 | 415000 | 200° C. × 10 H | Below 1 | A | A | A |
| Comparative Ex. 5 | Synthesis Ex. 5 | 3.3 | 309.7 | 6.7 | 178000 | 200° C. × 10 H | Below 1 | A | A | B |
| Comparative Ex. 6 | Synthesis Ex. 4 | 5.5 | 301.8 | 6.8 | 419000 | Untreated | 235 | A | B | C |

The data in Table 3 indicate that whereas Examples 5 and 6 involving pellets having comparatively few unstable terminal groups and comparatively high MIT values showed substantially no cracks even after 120 days of ozone exposure, Comparative Example 5 involving pellets having a comparatively low MIT value and Comparative Example 6 involving pellets having comparatively many unstable terminal groups developed many cracks as the ozone exposure time was prolonged. Moreover, Comparative Example 6 was found to show a larger number of cracks than Comparative Example 5 involving a lower MIT value.

INDUSTRIAL APPLICABILITY

The molding materials for ozone-resistant molding/shaped articles, ozone-resistant molding/shaped articles, ozone-resistant injection-molded articles, and injection- 5. The molding material for ozone-resistant molding/shaped articles according to claim 1
   wherein the copolymer (A) has an MIT value satisfying the following formula (1):

$$(MIT\ value) \geq [7 \times 10^6 \times (\text{melt flow rate})^{-2}] \quad (1).$$

6. An ozone-resistant molding/shaped article for semiconductor production equipments
   which is obtained by molding the molding material for ozone-resistant molding/shaped articles according to claim 1.

7. The ozone-resistant molding/shaped article according to claim 6
   which is a piping material for semiconductor production equipments or a joint for semiconductor production equipments.

8. A copolymer comprising tetrafluoroethylene and a perfluorovinylether,
   wherein a perfluorovinylether unit accounts for not less than 3.5 mass % of the copolymer, the total of tetrafluoroethylene and perfluorovinylether units accounts for not less than 95 mol % of all the monomer units, the number of unstable terminal groups is not more than 50 per $1\times10^6$ carbon atoms, and
   a melting point ranges from not less than 295° C. to not more than 310° C.

* * * * *